United States Patent Office 2,918,477
Patented Dec. 22, 1959

2,918,477

CAFFEIC ESTERS OF QUINIC ACID AND QUINIC ACID AMIDE AND SYNTHESES THEREOF

Carlo Giuseppe Alberti, Alberto Vercellone, and Domenico Cattapan, Milan, Italy

No Drawing. Application December 27, 1955
Serial No. 555,284

Claims priority, application Italy December 28, 1954

10 Claims. (Cl. 260—340.2)

This invention relates to new caffeic esters of quinic acid and quinic acid amide and to the syntheses of producing these esters.

In the copending applications Serial No. 510,866 of May 16, 1955, and Serial No. 555,283 of December 27, 1955, of which this application is a continuation-in-part, methods have been described for the synthesis of caffeic esters of quinic acid which were found to be energetic stimulants of biliary secretion and of cholesterol metabolism.

More particularly, the present invention relates to tricaffeyl-quinic acid compounds which represent valuable intermediates that, as shown, can be readily converted into 1,4-dicaffeyl-quinic acid (cynarine) and the amide thereof.

In general, these methods comprise a condensation reaction between a caffeic acid derivative (I) of the type

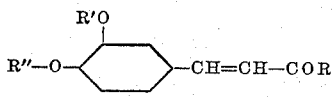

wherein R represents chlorine or

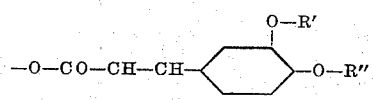

and wherein R′, R″ individually represent carbomethoxy, carboethoxy and carbobenzoxy, and jointly represent thionyl or carbonyl, with a compound of the group consisting of quinide and the 4,5-alkylidene derivatives of quinide corresponding to the formula

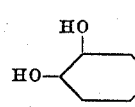

wherein X, Y individually represent hydrogen and jointly represent alkylidene (isopropylidene), to obtain intermediates of the general formula

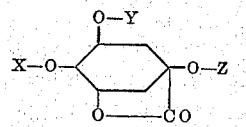

wherein X, Y, Z individually represent the radical

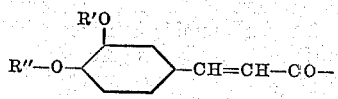

Z represents said radical while X and Y jointly represent alkylidene (isopropylidene) and X, Z individually represent said radical while Y represents hydrogen. These intermediates are then subjected to a selected saponification to obtain various caffeic esters of quinic acid and quinide.

Now we have discovered that, in case of the intermediate according to the foregoing general Formula III, wherein X, Y and Z represent the radical

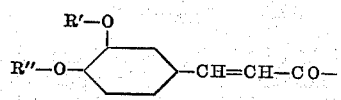

obtained by condensing 3 to 1 mols of a caffeic acid derivative according to Formula I with 1 to 3 mols of quinide by heating for fifteen to ninety minutes to a temperature of 110–180° C., upon treatment with aqueous acetic acid (30–70%), at a temperature of 80 to 100° C. for one to ten hours and with or without prior separation, saponification of the acyl radicals R′ and R″ of the caffeic acid occurs and a splitting of the lactone link of the quinide, resulting in the formation of 1,4,5-tricaffeyl-quinic acid (IV), while treatment with N ammonia at a temperature of 0–30° C. for one to forty hours in an inert atmosphere results in the formation of the amide of 1,4,5-tricaffeyl-quinic acid (V)

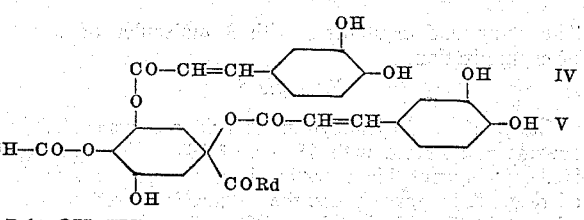

Rd=OH (IV)
Rd=NH₂ (V)

Moreover, we have discovered that, upon subjecting 1,4,5-tricaffeyl-quinic acid (IV) or the amide thereof (V) for one to forty hours and at a temperature from 0 to 30° C. to the action of a 3% barium hydroxide solution in an inert atmosphere, followed by acidifying with hydrochloric acid, only the caffeic radical in the 5-position is saponified, resulting in 1,4-dicaffeyl-quinic acid (VI) or the amide thereof (VII)

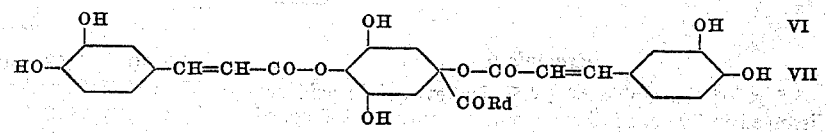

Rd=OH (VI)
Rd=NH₂ (VII)

The following examples are presented to illustrate the invention, but in no way to restrict the scope thereof.

Example 1

11.6 g. of carbonyl-caffeic-acid chloride are mixed with 3.06 g. of quinide and gradually heated during a period of one and one half hours to 180° C. A molten mass is obtained which, after taking up with acetone and crystallizing therefrom, yields 1,4,5-tricaffeyl-quinide-tricarbonate, M.P. 280–285° C. (decomposition), $(\alpha)_D^{20°} = +189° \pm 1°$ (c.=1.0; dioxane)

Example 2

An intimate mixture of 5.5 g. of carbonyl-caffeic-acid chloride and 12.8 g. of quinide is heated within one hour to 150° C. and kept at this temperature for thirty minutes. The mass is cooled and extracted with water in order to remove unreacted quinide; it is then filtered again and the cake dissolved in hot dioxane. The solution is introduced into 60 cc. of N NH$_4$OH solution, operating in an atmosphere of nitrogen. After standing overnight, the mixture is acidified and concentrated to one-third of its volume. The material separating thereby is filtered off and crystallized from 50% acetic acid. The crystalline product is the amide of 1,4,5-tricaffeyl-quinic-acid, $(\alpha)_D^{22°} = -255 \pm 1°$ (c.=2.0; ethanol).

Example 3

3.5 g. of 1,4,5-tricaffeyl-quinide-tricarbonate suspended in 35 cc. of dioxane are poured in a nitrogen atmosphere into 100 cc. of N NH$_4$OH, cooled to 10° C. and left standing overnight. In the morning, the mixture is acidified, concentrated under vacuum to ¼ of its volume, filtered and the resulting amide of 1,4,5-tricaffeyl-quinic acid crystallized from 25 cc. of 50% acetic acid.

Example 4

5.0 g. of 1,4,5-tricaffeyl-quinide-tricarbonate are refluxed for six hours with 200 cc. of 50% acetic acid. A solution is obtained, from which, upon concentration and dilution with water, 1,4,5-tricaffeyl-quinic acid crystallizes which, after recrystallization from 30% acetic acid, has a M.P. of 218–220° C. (decomposition)

$(\alpha)_D^{22°} = -268 \pm 1°$ (c.=2.0; ethanol)

The compound crystallizes with 3 molecules of water of crystallization.

Example 5

6.0 g. of 1,4,5-tricaffeyl-quinic acid are suspended in acetone and treated with 450 cc. of 3% barium hydroxide, carrying out this operation in a nitrogen flow while stirring. After forty hours, the mixture is filtered, treated with 2 N hydrochloric acid and filtered again; the filtrate is treated with a 10% sodium bicarbonate solution and is filtered once more. The cake is washed with 2 N hydrochloric acid and water, and dissolved in 55% acetic acid while heating.

1.4 dicaffeyl-quinic acid crystallizes, having an M.P. of 225–227° C., $(\alpha)_D^{21°} = -65° \pm 1°$ (c.=2.0; ethanol).

Example 6

1.5 g. of the amide of 1,4,5-tricaffeyl-quinic acid are dissolved in 30 cc. of dioxane and poured into 200 cc. of 3% barium hydroxide at 10–15° C., operating in a stream of nitrogen. After standing at room temperature for forty hours, the yellowish brown precipitate is filtered off and washed in 15 cc. of 2 N HCl. After standing for two hours in a refrigerator, the product is filtered and treated with 5 cc. of a 10% NaHCO$_3$ solution. The whitish, undissolved product, representing the amide of 1,4-dicaffeyl-quinic acid, is filtered off and crystallized from 20 cc. of 30% aqueous acetic acid, M.P. 233–235° C. $(\alpha)_D^{20°} = -82° \pm 1°$ (c.=2.0; pyridine).

We claim:

1. The process of synthesizing caffeic esters of quinic acid and quinic acid amide of the general formula

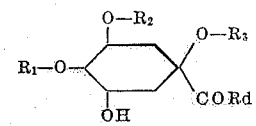

wherein Rd represents a member selected from the group consisting of hydroxyl and amine, R$_1$, R$_3$ represent the radical

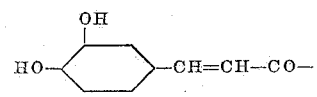

and R$_2$ represents a member selected from the group consisting of said radical and hydrogen, which comprises mixing 1 to 3 mols of a caffeic acid derivative of the type

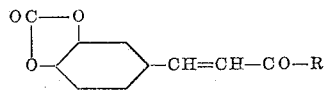

wherein R represents a member of the group consisting of chlorine and the radical

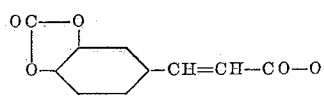

with 3 to 1 mols of quinide, heating the mixture for fifteen to ninety minutes to a temperature of 110 to 180° C. to form a condensation product between said caffeic acid derivative and said quinide, and treating with a member of the group of saponifying agents consisting of dilute acetic acid and dilute ammonia.

2. The process according to claim 1, which comprises treating the reaction mixture after said heating with acetone and recovering from said solvent a crystalline condensation product of the general formula

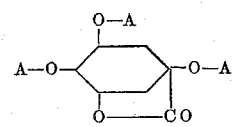

wherein A represents the radical

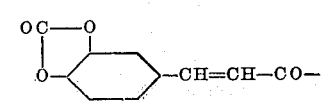

3. The process according to claim 2, comprising heating said condensation product for one to ten hours

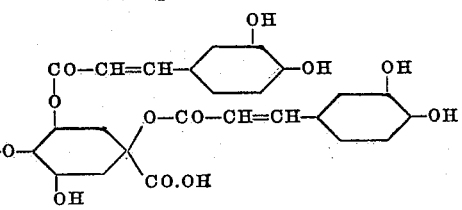

with 30 to 70% aqueous acetic acid to a temperature of 80 to 100° C. and crystallizing 1,4,5-tricaffeyl-quinic acid by concentrating the solution.

4. The process according to claim 2, comprising heating said condensation product in an inert atmosphere for one to forty hours with N ammonia at a temperature of 0 to 30° C. and crystallizing 1,4,5-tricaffeyl-quinic-acid amide

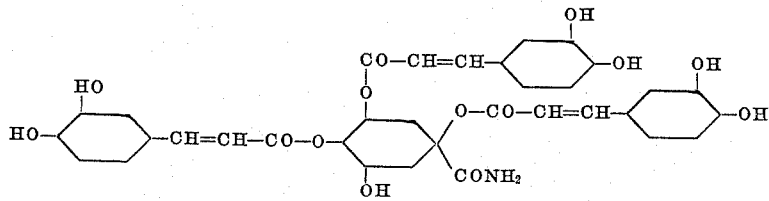

by acidifying and concentrating the solution.

5. The process of synthesizing 1,4-dicaffeyl-quinic acid and 1,4-dicaffeyl-quinic-acid amide which comprises treating a member selected from the group consisting of 1,4,5-tricaffeyl-quinic acid and 1,4,5-tricaffeyl-quinic-acid-amide in an inert atmosphere for one to forty hours with 3% barium hydroxide at a temperature of 0 to 30° C. and acidifying with hydrochloric acid.

6. Caffeic esters of quinic acid and quinic acid amide of the general formula

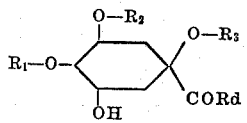

wherein Rd represents a member selected from the group consisting of hydroxyl and amine and $R_1$, $R_2$ and $R_3$ represent the radical

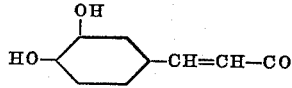

7. 1,4,5-tricaffeyl-quinic acid.
8. 1,4,5-tricaffeyl-quinic acid amide.

9. 1,4,5-tricaffeyl-quinide-tricarbonate

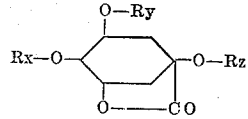

wherein Rx, Ry, Rz represent the radical

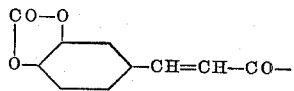

10. 1,4-dicaffeyl-quinic-acid amide

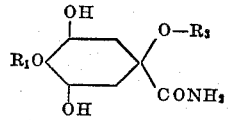

wherein $R_1$ and $R_3$ represent the radical

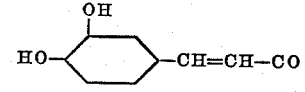

References Cited in the file of this patent
Erwig et al.: Berichte, vol. 22 (1889, pp. 1457–64.
Josephson: Berichte, vol. 60 (1927), pp. 2270–72.

UNITED STATES PATENT OFFICE

Certificate

Patent No. 2,918,477                                        Patented December 22, 1959

Carlo Giuseppe Alberti, Alberto Vercellone
and
Domenico Cattapan

Application having been made jointly by Carlo Giuseppe Alberti, Alberto Vercellone and Domenico Cattapan, the inventors named in the patent above identified, Farmaceutici Italia S.A., asserted assignee, and Luigi Panizzi, for the issuance of a certificate under the provisions of Title 35, Section 256 of the United States Code, deleting the names of the said Carlo Giuseppe Alberti and the said Domenico Cattapan from the patent as joint inventors, and adding the name of the said Luigi Panizzi to the patent as a joint inventor, and a showing and a proof of facts satisfying the requirements of the said section having been submitted, it is this 23rd day of May 1961, certified that the names of the said Carlo Giuseppe Alberti and Domenico Cattapan are hereby deleted from the said patent as joint inventors with the said Alberto Vercellone, and that the name of the said Luigi Panizzi is hereby added to the said patent as a joint inventor with the said Alberto Vercellone.

[SEAL]

ARTHUR W. CROCKER,
*First Assistant Commissioner of Patents.*